United States Patent
Faruque et al.

(10) Patent No.: US 10,953,771 B2
(45) Date of Patent: Mar. 23, 2021

(54) SEAT ROTATION POSITION SENSOR

(71) Applicant: Ford Global Technologies, LLC, Dearborn, MI (US)

(72) Inventors: Mohammad Omar Faruque, Ann Arbor, MI (US); S. M. Iskander Farooq, Novi, MI (US); Mark A. Cuddihy, New Boston, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 56 days.

(21) Appl. No.: 16/368,379

(22) Filed: Mar. 28, 2019

(65) Prior Publication Data

US 2020/0307418 A1 Oct. 1, 2020

(51) Int. Cl.
*B60N 2/16* (2006.01)
*B60N 2/14* (2006.01)
*B60N 2/02* (2006.01)
*B60N 2/06* (2006.01)

(52) U.S. Cl.
CPC .......... *B60N 2/1635* (2013.01); *B60N 2/0232* (2013.01); *B60N 2/0248* (2013.01); *B60N 2/0276* (2013.01); *B60N 2/06* (2013.01); *B60N 2/14* (2013.01)

(58) Field of Classification Search
CPC .. B60N 2/1635; B60N 2/0232; B60N 2/0248; B60N 2/0276; G01B 7/16; G01B 21/22; G01D 5/28; G01D 5/347
See application file for complete search history.

(56) References Cited

U.S. PATENT DOCUMENTS

| 2,588,165 | A | * | 3/1952 | Rossmann | ........... B60N 2/0232 |
| | | | | | 74/89.36 |
| 6,410,909 | B1 | | 6/2002 | Rudolph et al. | |
| 6,486,767 | B1 | | 11/2002 | Rainey | |
| 9,821,681 | B2 | | 11/2017 | Rao et al. | |
| 9,994,125 | B2 | | 6/2018 | Magaña et al. | |
| 2003/0098661 | A1 | * | 5/2003 | Stewart-Smith | ... B64D 11/0624 |
| | | | | | 318/445 |
| 2004/0017190 | A1 | | 1/2004 | McDearmon et al. | |
| 2020/0031256 | A1 | * | 1/2020 | Werhahn | ................ B60N 2/164 |

FOREIGN PATENT DOCUMENTS

| JP | 2008143440 A | 6/2008 |
| JP | 2015155842 A | 8/2015 |

* cited by examiner

*Primary Examiner* — Faye M Fleming
(74) *Attorney, Agent, or Firm* — Frank A. MacKenzie; Bejin Bieneman PLC (57) ABSTRACT

A vehicle includes a base and a seat rotatable relative to the base. The vehicle includes a helical ramp fixed relative to one of the base and the seat. The vehicle includes a linear variable differential transformer (LVDT) including a housing fixed relative to the other of the base and the seat and a plunger moveably supported by the housing. The plunger contacts the helical ramp.

20 Claims, 6 Drawing Sheets

SEAT ROTATION POSITION SENSOR

BACKGROUND

A vehicle may include amenities that allow occupants to face one another during operation of the vehicle. As one example, an autonomous vehicle may be autonomously operated, allowing occupants of the vehicle to ride in the vehicle without monitoring the operation of the vehicle. Specifically, the autonomous vehicle may include seats free to rotate between rides of the vehicle between forward-facing and rearward-facing positions.

DETAILED DESCRIPTION

A vehicle includes a base and a seat rotatable relative to the base. The vehicle includes a helical ramp fixed relative to one of the base and the seat. The vehicle includes a linear variable differential transformer (LVDT) including a housing fixed relative to the other of the base and the seat and a plunger moveably supported by the housing. The plunger contacts the helical ramp.

The vehicle may include a solenoid operatively coupled to the plunger of the linear variable differential transformer.

The vehicle may include a computer including a processor and a memory storing instructions executable by the computer to actuate the solenoid to move the plunger toward or away from the helical ramp.

The solenoid may include a coil and an armature, the armature connected to the plunger of the linear variable differential transformer.

The armature may have a longitudinal axis and the plunger has a longitudinal axis spaced from the longitudinal axis of the armature.

The armature may have a longitudinal axis and the plunger has a longitudinal axis aligned with the longitudinal axis of the armature.

The vehicle may include a spring biasing the plunger toward the helical ramp.

The vehicle may include a track, the base being slidably attached to the track.

The seat may be rotatable about a vertical axis relative to the base.

The helical ramp may be concentric about the vertical axis.

The vehicle may include a rotational lock between the base and the seat.

A computer comprising a processor and a memory storing instructions executable by the computer to move a plunger of a linear variable differential transformer away from a helical ramp during rotation of a seat relative to a base. The linear variable differential transformer is fixed to one of the base and the seat and the helical ramp is fixed to the other of the base and the seat. The instructions include instruction to move the plunger of the linear variable differential transformer into contact with the helical ramp when the seat is rotationally fixed relative to the base.

The instructions may include instructions to determine a linear position of the plunger of the linear variable differential transformer when the plunger is contacting the helical ramp.

The instructions may include instructions to calculate a rotational position of the seat based on the linear position of the plunger when the plunger is contacting the helical ramp.

With reference to the Figures, wherein like numerals indicate like parts throughout the several views, a vehicle 10 includes a base 12 and a seat 14 rotatable relative to the base 12. The vehicle 10 includes a helical ramp 16 fixed relative to one of the base 12 and the seat 14. The vehicle 10 includes a linear variable differential transformer (LVDT) 18 including a housing 20 fixed relative to the other of the base 12 and the seat 14 and a plunger 22 moveably supported by the housing 20. The plunger 22 contacts the helical ramp 16.

The seat 14 may rotate 360 degrees in the vehicle 10. The rotational position of the seat 14 may be determined using the LVDT 18 and the helical ramp 16. The plunger 22 of the LVDT 18 contacts the helical ramp 16 and the plunger 22 moves relative to the housing 20 of the LVDT 18 as the plunger 22 rides along the helical ramp 16. The position of the plunger 22 relative to the housing 20 indicates the rotational position of the seat 14, as described below. The rotational position of the seat 14 may be used to, for example, operate occupant restraint systems of the vehicle 10.

Figure 1:
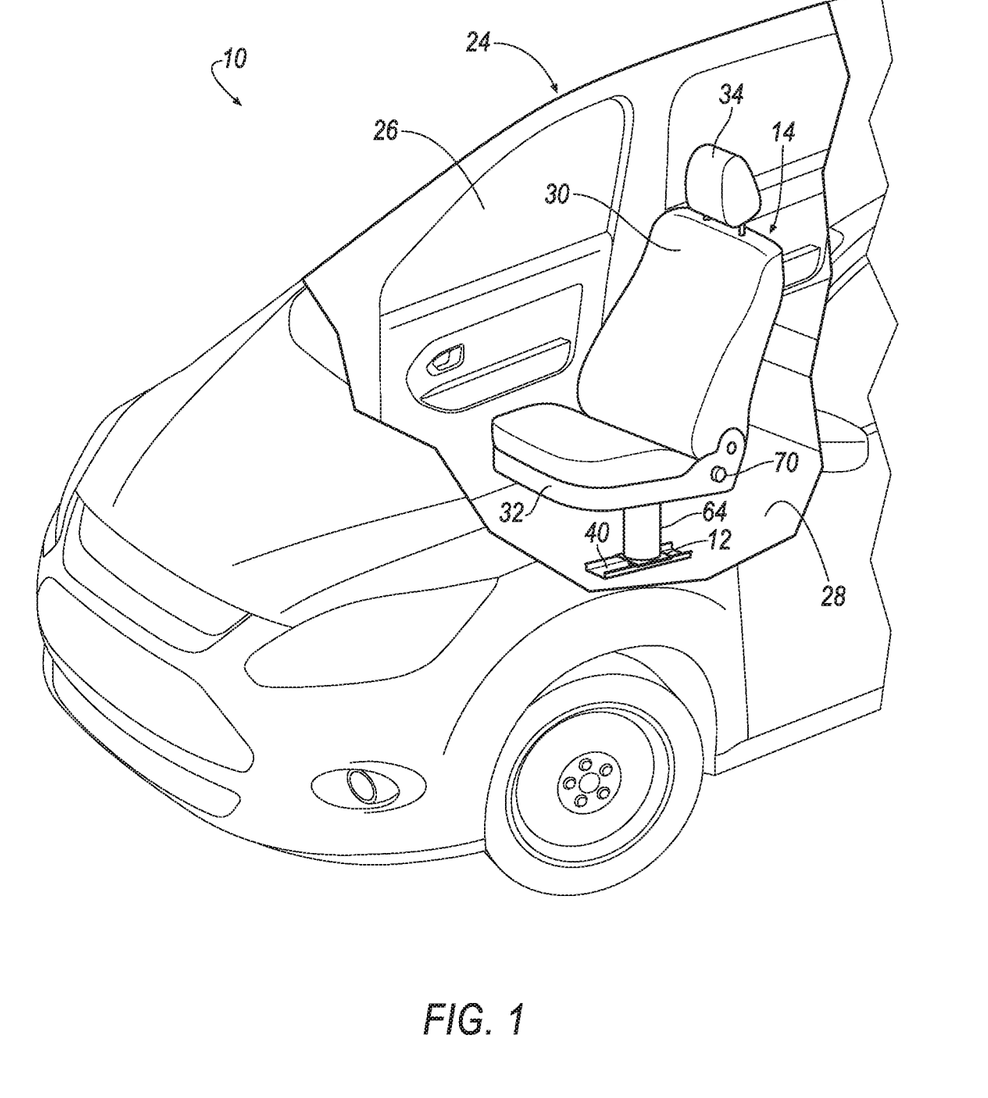
FIG. 1 is a perspective view of a vehicle including a seat that is rotatable.

With reference to FIG. 1, the vehicle 10 includes a body 24. The body 24 of the vehicle 10 defines a passenger compartment 26 to house occupants, if any, of the vehicle 10. The body 24 of the vehicle 10 includes a floor 28 disposed at the bottom of the passenger compartment 26.

The passenger compartment 26 includes one or more seats 12. The vehicle 10 may include any suitable number of seats 12 in any suitable position, e.g., front seats, back seats, left side, right side, etc. The position and orientation of the seats 12 and components thereof may be adjustable.

The seat 14 may include a seat back 30, a seat bottom 32, and a head restraint 34. The head restraint 34 may be supported by the seat back 30 and may be stationary or movable relative to the seat back 30. The seat back 30 may be supported by the seat bottom 32 and may be stationary or movable relative to the seat bottom 32. The seat back 30, the seat bottom 32, and/or the head restraint 34 may be adjustable in multiple degrees of freedom. Specifically, the seat back 30, the seat bottom 32, and/or the head restraint 34 may themselves be adjustable, in other words, adjustable components within the seat back 30, the seat bottom 32, and/or the head restraint 34 may be adjustable relative to each other.

The seat 14 may include a pedestal 36. The pedestal 36 may be fixed to the seat bottom 32 and supports the seat bottom 32 on base 12. The pedestal 36 may be fixed to the seat bottom 32 in any suitable way, e.g., welding, fasteners, etc. The base 12 includes an opening 38 that receives the pedestal 36 of the seat 14. The base 12 may support the pedestal 36 of the seat 14. The pedestal 36 may extend from the base 12 to the seat bottom 32.

The vehicle 10 may include a track 40 fixed to the floor 28. In the example shown in FIGS. 1-3, the track 40 is elongated in a vehicle-longitudinal direction, i.e., vehicle-forward to a vehicle-rearward direction. In another example, the track 40 may extend in a cross-vehicle direction. The track 40 may be fixed to the floor 28 in any suitable way, e.g., welding, fasteners, etc.

Figure 2:
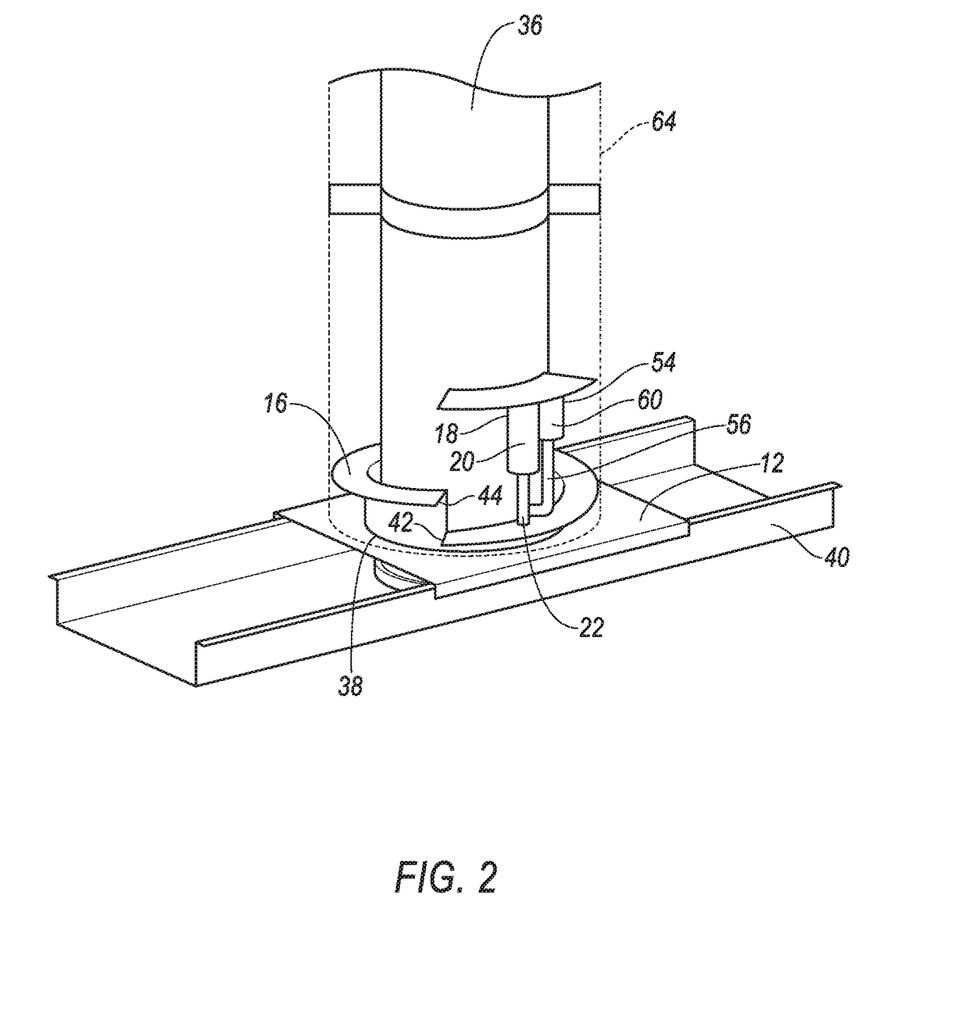
FIG. 2 is a perspective view of a base of the seat having a linear variable differential transformer on a different longitudinal axis from a solenoid to measure the rotation of the seat.
Figure 3:
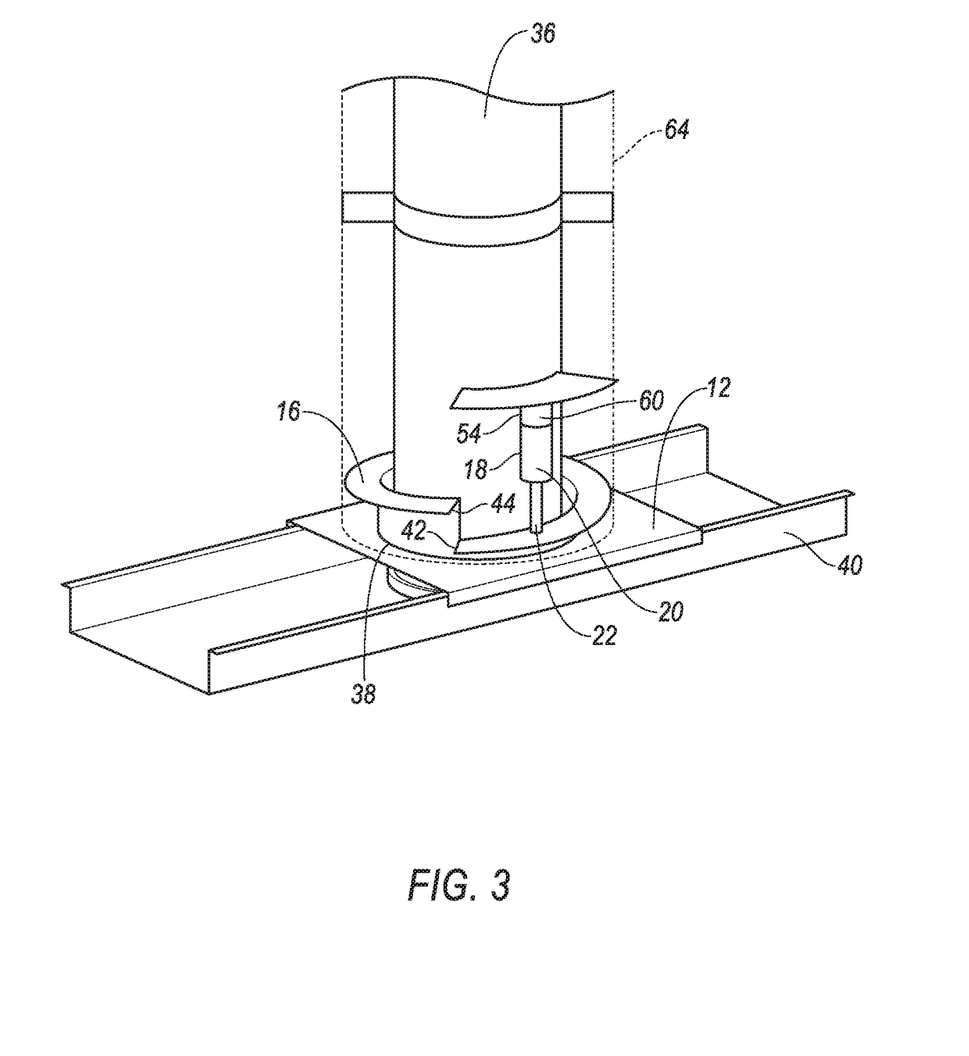
FIG. 3 is a perspective view of the base of the seat having the linear variable differential transformer on the same longitudinal axis as the solenoid to measure the rotation of the seat.

The base 12 may be slidably attached to the track 40, i.e., the base 12 may slide relative to the floor 28 of the passenger compartment 26 along the track 40. In such an example, the base 12 and the seat 14 slide along the track 40 as a unit. The base 12 may be releasably lockable to the track 40 so that the base 12 and seat 14 may be adjusted along the track 40 and locked in place along the track 40. For example, clamps, solenoids, motors, gears, etc., may be between the base 12 and the track 40 for selectively locking the base 12 and the track 40 relative to each other. The locking and unlocking of the base 12 relative to the track 40, may be automated (e.g., by electro-mechanical hardware such as switches, motors, and/or solenoids, etc.), or manual (e.g., by mechanical hardware such as a lever).

The seat 14 is rotatable relative to the base 12. The seat 14 may be rotatable about a vertical axis with the opening 38 of the base 12 being concentric about the vertical axis. The pedestal 36 of the seat 14 may extend from the seat bottom 32 through the base 12 along the vehicle axis. The seat 14 may rotate between an infinite number of positions about the vertical axis, i.e., the seat 14 may face an infinite number of directions in the passenger compartment 26. As described below, the seat 14 may be releasably lockable in any selected position.

As set forth above, the helical ramp 16 is fixed relative to one of the base 12 and the seat 14. In the example shown in FIGS. 2 and 3, the helical ramp 16 is fixed to the base 12 and extends around the pedestal 36 of the seat 14. In this example, the helical ramp 16 is stationary relative to the base 12 when the seat 14 rotates relative to the base 12. In another example, the helical ramp 16 may be fixed to the seat 14, e.g., the pedestal 36 of the seat 14. In an example in which the helical ramp 16 is fixed to the seat 14, the helical ramp 16 rotates with the seat 14 as the seat 14 rotates relative to the base 12.

The helical ramp 16 includes a low end 42 and a high end 44. The helical ramp 16 extends helically around the pedestal 36 from the low end 42 to the high end 44 with the high end 44 being spaced generally vertically from the low end 42. The helical ramp 16 is concentric about the vertical axis, i.e., the helical ramp 16 is concentric about the pedestal 36 of the seat 14.

Figure 4:
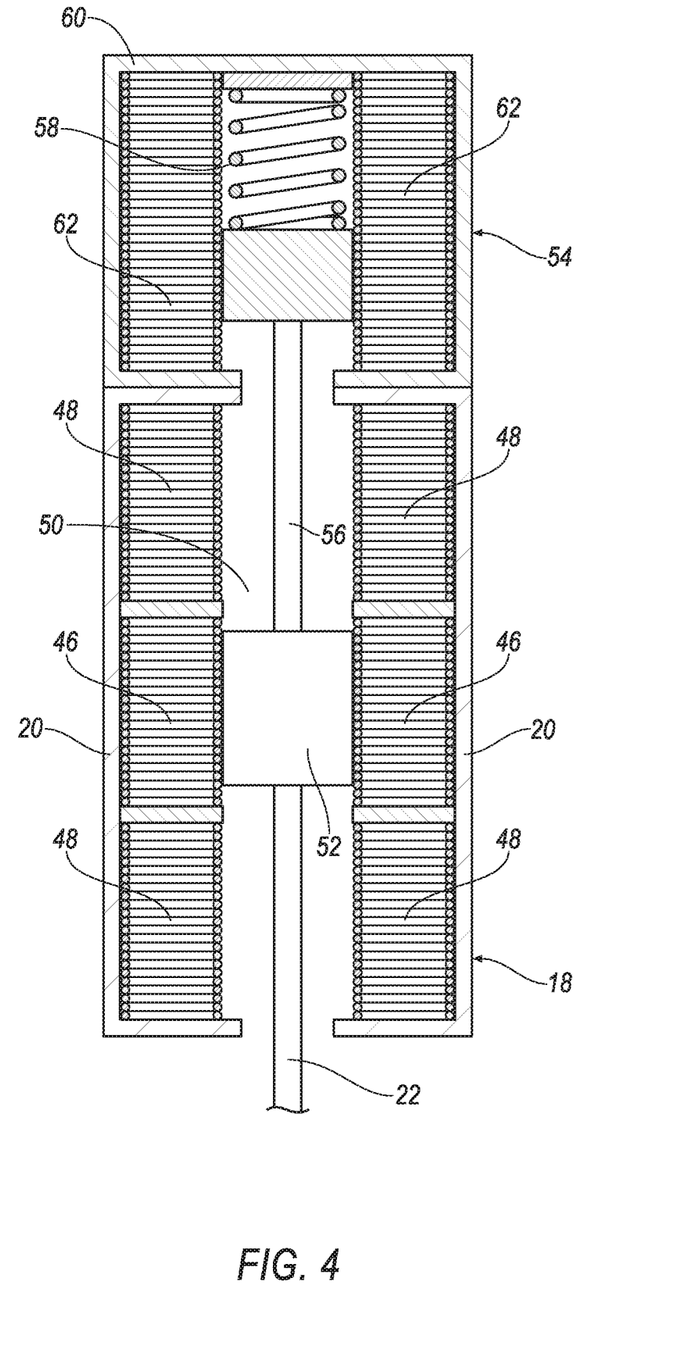
FIG. 4 is a section view of the linear variable differential transformer on the same longitudinal axis as the solenoid.

The LVDT 18 extends along a longitudinal axis generally parallel to the vertical axis. The LVDT 18 includes a primary coil 46 and a pair of secondary coils 48 disposed in the housing 20. The coils are stacked inside the housing 20 with the primary coil 46 positioned between the two secondary coils 48. The coils 46, 48 are concentric about the longitudinal axis of the LVDT 18. The coils 46, 48 define a bore 50 extending along the longitudinal axis and through the centers of the coils 46, 48. The bore 50 may be cylindrical.

The LVDT 18 includes a core 52 disposed in the bore 50. The core 52 is moveable axially along the bore 50 along the longitudinal axis. The core 52 is in a neutral position when the core 52 is spaced equidistantly between the top and the bottom of the housing 20, i.e., the core 52 is aligned with the primary coil 46 when in the neutral position.

Deviation of the core 52 from the neutral position is measured to determine the position of the plunger 22. Specifically, the core 52, the primary coil 46, and secondary coils 48 generate a magnetic field. The magnetic field is used to determine the position of the core 52 inside the bore 50. When the core 52 is at different positions in the cylindrical bore 50, a different magnetic field is generated between the core 52, the primary coil 46, and the secondary coils 48. Based on the change in magnetic field, the linear displacement of the core 52 inside the bore 50 can be determined, i.e., a linear measurement of the displacement of the core 52 from the neutral position may be determined.

The plunger 22 is attached to the core 52 of the LVDT 18. The core 52 and the plunger 22 of the LVDT 18 move together as a unit. Accordingly, the core 52 moves when the plunger 22 rides on the helical ramp 16. A measurement of the linear displacement of the plunger 22 may be determined based on the linear displacement of the core 52 from the neutral position. In other words, the rotational position of the seat 14 may be determined based on the vertical position of the plunger 22.

The plunger 22 of the LVDT 18 may be biased into contact with the helical ramp 16 for measuring the rotational position of the seat 14 and may be retracted away from the helical ramp 16 to allow the seat 14 to rotate relative to the base 12. Specifically, when the seat 14 is rotationally fixed relative to the base 12, the plunger 22 is biased against the helical ramp 16. When the seat 14 rotates about the vertical axis, the plunger 22 is retracted away from the helical ramp 16. Specifically, the plunger 22 is retracted away from the helical ramp 16 to a position above the high end 44 of the ramp so that the seat 14 may rotate 360 degrees without contacting the high end 44.

As an example, the vehicle 10 includes a solenoid 54 that extends and retracts the plunger 22 relative to the helical ramp 16. The solenoid 54 is operatively coupled to the plunger 22 of the LVDT 18 to move the plunger 22 relative to the housing 20 of the LVDT 18. Specifically, the solenoid 54 includes an armature 56 coupled to the core 52 and plunger 22 of the LVDT 18 to move the plunger 22. The armature 56, the core 52, and the plunger 22 may be unitary, i.e., a single piece of material with no seams, joints, fasteners, or adhesives holding it together. As another example, the armature 56, the core 52, and/or the plunger 22 may be separately formed and subsequently assembled together.

The solenoid 54 may include a spring 58 for biasing the armature 56 toward or away from the helical ramp 16. The solenoid 54 includes a housing 60 and a coil 62 disposed in the housing 60. The housing 60 is fixed to the seat 14, e.g., the pedestal 36 of the seat 14. In the example, shown in FIG. 4, the spring 58 biases the armature 56 toward the helical ramp 16 and activation of the solenoid 54 retracts the armature 56 away from the helical ramp 16 against the bias of the spring 58. In another example, the spring 58 may bias the armature 56 away from the helical ramp 16 and activation of the solenoid 54 may extend the armature 56 toward from the helical ramp 16 against the bias of the spring 58. The spring 58 may, for example, abut the armature 56. The spring 58 may be in the housing 60.

In one example, as shown in FIG. 2, the housing 60 and the armature 56 of the solenoid 54 may be offset from the longitudinal axis of plunger 22. In such an example, the armature 56 may include a horizontal component, e.g., a bend, a bracket, etc., connected to the plunger 22.

In another example, as shown in FIG. 3, the solenoid 54 and the LVDT 18 may be axially aligned. In other words, the armature 56 has a longitudinal axis aligned with the longitudinal axis of the plunger 22. In this example, the solenoid 54 may be stacked with the LVDT 18. In such an example, the armature 56 of the solenoid 54 and the core 52 of the LVDT 18 move together as a unit along the longitudinal axis.

The base 12 may include a sheath 64 surrounding the pedestal 36 of the seat 14. The sheath 64 is fixed relative to the base 12, i.e., the sheath 64 does not rotate relative to the base 12 when the seat 14 rotates. The helical ramp 16, LVDT 18, and solenoid 54 are between the pedestal 36 of the seat 14 and the sheath 64.

Figure 5:
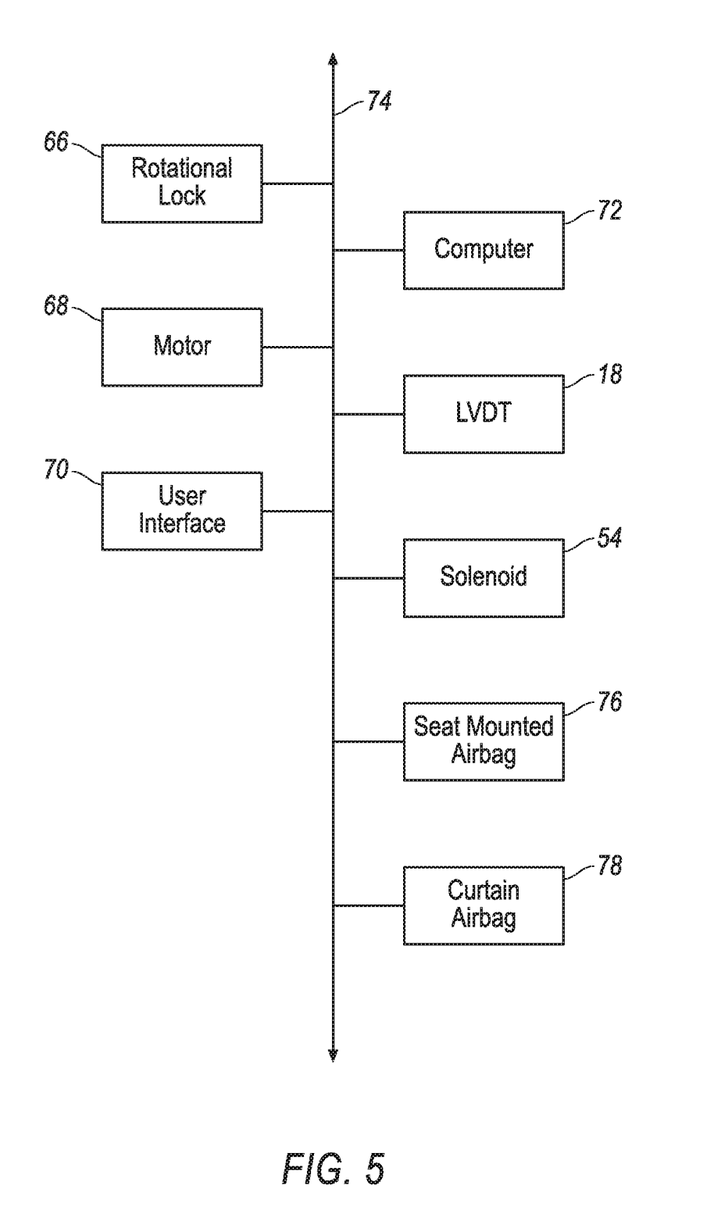
FIG. 5 is a block diagram of a system of the vehicle.

With reference to FIG. 5, the vehicle 10 may include a rotational lock 66 between the base 12 and the seat 14. The rotational lock 66 releasably locks rotation of the seat 14 relative to the base 12. When the rotational lock 66 is released, the seat 14 may rotate relative to the base 12 about the vertical axis. The rotational lock 66 may be, for example, a solenoid, a clamp, or any suitable mechanism releasably locks rotation of the seat 14 relative to the base 12.

With continued reference to FIG. 5, the vehicle 10 may include a motor 68 for rotating the seat 14 relative to the base 12. The motor 68 may be disposed between the pedestal 36 and the base 12 for rotating the pedestal 36 relative to the base 12. The motor 68 may be designed to rotate the pedestal 36 relative to the base 12 when the rotational lock 66 is unlocked. As another example, the motor 68 may operate as both the rotational lock 66 and the rotational motor 68. In other words, the motor 68 may maintain the rotational position of the pedestal 36 relative to the base 12 when the motor 68 is stationary and may rotate the pedestal 36 relative to the base 12 when the motor 68 is activated.

The locking and unlocking of the seat 14 relative to the base 12, may be automated (e.g., by electro-mechanical hardware such as switches, motors, and/or solenoids, etc.), or manual (e.g., by mechanical hardware such as a lever). The seat 14 may include a user interface 70, e.g., a button, lever, switch, etc., that controls engagement and disengagement of the rotational lock 66. When the user interface 70 is operated to disengage the rotational lock 66 to allow rotation of the seat 14 relative to the base 12, the plunger 22 of the LVDT 18 is moved away from the helical ramp 16, and when the user interface 70 is operated to engage the rotational lock 66 to prevent rotation of the seat 14 relative to the base 12, the plunger 22 of the LVDT 18 is moved toward the helical ramp 16.

The vehicle 10 may include a computer 72. The computer 72 may be in communication with a communication network 74 of the vehicle 10 to send and/or receive instructions to and from components of the vehicle 10. The computer 72 may be a microprocessor-based computing device implemented via circuits, chips, or other electronic components. The computer 72 includes a processor, memory, etc. The memory of the computer 72 includes memory for storing instructions executable by the computer 72 as well as for electronically storing data and/or databases.

The computer 72, implemented via circuits, chips, or other electronic components, is included in a vehicle control system for carrying out various operations, including as described herein. The computer 72 is a computing device that generally includes the processor and the memory, the memory including one or more forms of computer-readable media and storing instructions executable by the computer 72 for performing various operations, including as disclosed herein. The memory of the computer 72 further generally stores remote data received via various communications mechanisms; e.g., the computer 72 is generally configured for communications on the computer area network (CAN) bus or the like, and/or for using other wired or wireless protocols, e.g., Bluetooth, etc. The computer 72 may also have a connection to an onboard diagnostics connector (OBD-II). Via a communication network 74 using Ethernet, WiFi, the CAN bus, Local Interconnect Network (LIN), and/or other wired or wireless mechanisms, the computer 72 may transmit messages to various devices in the vehicle 10 and/or receive messages from the various devices, e.g., controllers, actuators, sensors, etc., as discussed herein.

The processor of the computer 72 may be programmed to send and receive signals. The processor may send signals to execute operations of components in the vehicle 10 based on the receipt of signals.

As shown in FIG. 5, the communication network 74 includes hardware, such as a communication bus, for facilitating communication among vehicle components. The communication network 74 may facilitate wired or wireless communication among the vehicle components in accordance with a number of communication protocols such as controller area network (CAN), Ethernet, WiFi, Local Interconnect Network (LIN), and/or other wired or wireless mechanisms.

Figure 6:
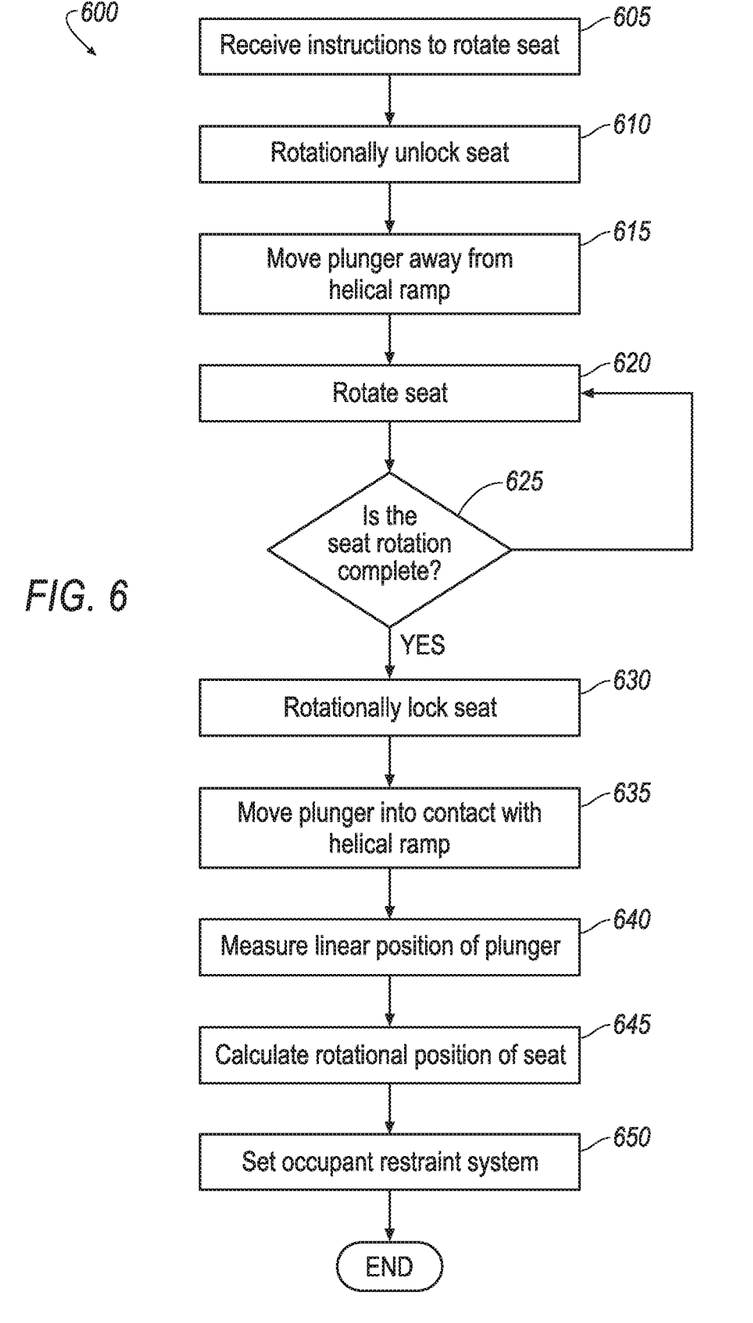
FIG. 6 is a flow chart of a process carried out by a computer of the vehicle.

With reference to FIG. 6, the computer 72 includes the processor and the memory storing instructions executable by the processor to receive a signal indicating that the seat 14 is rotating relative to the base 12, provide an instruction to retract the plunger 22 from the helical ramp 16, receive a signal indicating that the seat 14 is fixed relative to the base 12, and provide an instruction to extend the plunger 22 into contact with the helical ramp 16. The memory may store instructions to perform the process 600 and the steps shown in FIG. 6.

With reference to block 605, the memory stores instructions executable by the processor to receive instruction to rotate the seat 14. In one example, the instruction to rotate the seat 14 may be received from the user interface 70. In another example, the vehicle 10 may receive provide the instruction to rotate the seat 14, e.g., automatically.

With reference to block 610, the instructions may include instructions to release the rotational lock 66 in response to receiving instruction to rotate the seat 14. When the rotational lock 66 is released, the seat 14 is free to rotate, either manually by an occupant or automatically.

With reference to block 615, the instructions include instructions to move the plunger 22 away from the helical ramp 16 in response to the receiving instruction to rotate the seat 14. For example, the instructions include instructions to activate or deactivate the solenoid 54 to move the plunger 22 away from the helical ramp 16.

With reference to block 620, the instructions may include instructions to rotate the seat 14. In examples where the seat 14 is rotated automatically, e.g., by the motor 68, the memory may store instructions executable by the processor to instruct the motor 68 to rotate the pedestal 36 relative to the base 12. In the alternative, as set forth above, the seat 14 may be manually rotated, e.g. by the occupant. With reference to decision block 625, the instructions include instructions to determine of seat 14 rotation is complete. As one example, block 625 may include receiving an instruction, e.g., from the user interface 70, that the rotation is complete. As another example, block 625 may include identifying that the rotation is complete when the seat 14 is stationary relative to the base 12 for a predetermined period of time.

In response to identification that the seat 14 rotation is complete, the instructions include instruction to rotationally lock the seat 14 relative to the base 12 to prevent rotation of the seat 14, as shown in block 630. For example, the instructions may include instructing the rotational lock 66 to lock the pedestal 36 relative to the base 12.

With reference to block 635, in response to identification that the seat 14 rotation is complete and/or the instruction to rotationally lock the seat 14 relative to the base 12, the instructions may include instruction to move the plunger 22 of the LVDT 18 into contact with the helical ramp 16. The plunger 22 remains in contact with the helical ramp 16 when the seat 14 is rotationally fixed relative to the base 12.

With reference to block 640, the instructions include instructions to determine a linear position of the plunger 22 of the LVDT 18 when the plunger 22 is contacting the helical ramp 16. An LVDT 18 signal may be sent to the computer 72. The LVDT 18 signal includes a measurement of the linear position of the plunger 22 when the plunger 22 is contacting the helical ramp 16.

With reference to block 645, the instructions include instruction to calculate a rotational position of the seat 14 based on the linear position of the plunger 22 when the plunger 22 is contacting the helical ramp 16. The rotational position provides the direction the seat 14 is facing. The rotational position may be sent by the computer 72 to other systems within the vehicle 10 so that other systems in the vehicle 10 may be adjusted based on the seat 14 rotational position, e.g., a restraint control module, etc.

With reference to block 650, the instructions include controlling an occupant restraint system based on the rotational position of the seat 14 calculated in block 645 and/or the direction of the vehicle impact. In particular, the occupant restraint system may include restraint components including airbags (mounted to the seat 14 and/or other components of the vehicle 10), seat belts, pretensioners, etc. The occupant restraint system may include a restraints control module for controlling the restraint components, i.e., selectively activating or not activating the restraint components in response to a vehicle impact. Based on the rotational direction of the seat 14 and/or the direction of the vehicle impact, the computer 72 may determine which restraint components are activated or not activated in response to the vehicle impact.

As one example, the vehicle 10 may include one or more airbags including one or more seat-mounted airbags 76 and one or more body-mounted airbags. The seat-mounted airbags 76 may be, for example, a left-side airbag, a right-side airbag, and/or any airbag mounted to the seat back 30, the seat bottom 32, and/or the head restraint. The body-mounted airbags may be, for example, a curtain airbag, a ceiling-mounted airbag, a floor-mounted airbag, and/or a door-mounted airbag, etc. The memory may include instructions executable by the processor to selectively activate any component of the occupant restraint system based on the rotational position of the seat 14 as measured by the LVDT 18 on the helical ramp 16 and/or the direction of the vehicle impact. In other words, the memory may include instructions to activate some components of the occupant restraint system and not activate other components of the occupant restraint system based on the rotational position of the seat 14 and/or the direction of the vehicle impact. The choice of which components of the occupant restraint system are/are not activated is based on controlling the kinematics of the occupant based on the rotational position of the seat 14 and/or the direction of the vehicle impact. The memory may include an algorithm, lookup table, etc., providing rules for which components of the occupant restraint system are or are not activated.

The disclosure has been described in an illustrative manner, and it is to be understood that the terminology which has been used is intended to be in the nature of words of description rather than of limitation. Use of "in response to" and "upon determining" indicates a causal relationship, not merely a temporal relationship. Many modifications and variations of the present disclosure are possible in light of the above teachings, and the disclosure may be practiced otherwise than as specifically described.

What is claimed is:

1. A vehicle comprising:
   a base;
   a seat rotatable relative to the base;
   a helical ramp fixed relative to one of the base and the seat;
   a linear variable differential transformer having a housing fixed relative to the other of the base and the seat and a plunger moveably supported by the housing, the plunger contacting the helical ramp; and
   a rotational lock between the base and the seat.

2. The vehicle of claim 1, further comprising a solenoid operatively coupled to the plunger of the linear variable differential transformer.

3. The vehicle of claim 2, further comprising a computer including a processor and a memory storing instructions executable by the computer to actuate the solenoid to move the plunger toward or away from the helical ramp.

4. The vehicle of claim 2, wherein the solenoid includes a coil and an armature, the armature connected to the plunger of the linear variable differential transformer.

5. The vehicle of claim 4, wherein the armature has a longitudinal axis and the plunger has a longitudinal axis spaced from the longitudinal axis of the armature.

6. The vehicle of claim 4, wherein the armature has a longitudinal axis and the plunger has a longitudinal axis aligned with the longitudinal axis of the armature.

7. The vehicle of claim 1, further comprising a spring biasing the plunger toward the helical ramp.

8. The vehicle of claim 1, further comprising a track, the base being slidably attached to the track.

9. The vehicle of claim 1, wherein the seat is rotatable about a vertical axis relative to the base.

10. The vehicle of claim 9, wherein the helical ramp is concentric about the vertical axis.

11. A computer comprising a processor and a memory storing instructions executable by the computer to:
    move a plunger of a linear variable differential transformer away from a helical ramp during rotation of a seat relative to a base, the linear variable differential transformer being fixed to one of the base and the seat and the helical ramp being fixed to the other of the base and the seat; and
    move the plunger of the linear variable differential transformer into contact with the helical ramp when the seat is rotationally fixed relative to the base.

12. The computer of claim 11, wherein the instructions further include instructions to determine a linear position of the plunger of the linear variable differential transformer when the plunger is contacting the helical ramp.

13. The computer of claim 12, wherein the instructions further include instructions to calculate a rotational position of the seat based on the linear position of the plunger when the plunger is contacting the helical ramp.

14. The computer of claim 13, wherein the instructions further include controlling an occupant restraint system based on the rotational position of the seat and/or the direction of the vehicle impact.

15. A vehicle comprising:
    a base;
    a seat rotatable relative to the base;
    a helical ramp fixed relative to one of the base and the seat;
    a linear variable differential transformer having a housing fixed relative to the other of the base and the seat and a plunger moveably supported by the housing, the plunger contacting the helical ramp; and a spring biasing the plunger toward the helical ramp.

16. The vehicle of claim 15, comprising a rotational lock between the base and the seat.

17. The vehicle of claim 15, further comprising a solenoid operatively coupled to the plunger of the linear variable differential transformer.

18. The vehicle of claim 17, further comprising a computer including a processor and a memory storing instructions executable by the computer to actuate the solenoid to move the plunger toward or away from the helical ramp.

19. The vehicle of claim 15, wherein the seat is rotatable about a vertical axis relative to the base.

20. The vehicle of claim 19, wherein the helical ramp is concentric about the vertical axis.

* * * * *